(12) United States Patent
Shimizu et al.

(10) Patent No.: US 6,838,844 B2
(45) Date of Patent: Jan. 4, 2005

(54) ELECTRIC POWER STEERING APPARATUS

(75) Inventors: Yasuo Shimizu, Wako (JP); Atsuhiko Yoneda, Wako (JP); Yutaka Arimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 119 days.

(21) Appl. No.: 10/313,600

(22) Filed: Dec. 5, 2002

(65) Prior Publication Data

US 2003/0107339 A1 Jun. 12, 2003

(30) Foreign Application Priority Data

Dec. 6, 2001 (JP) ........................................ 2001-372372

(51) Int. Cl.$^7$ .............................. H02P 1/40; H02P 1/22; B62D 6/00
(52) U.S. Cl. ........................ 318/287; 318/293; 318/280; 180/410; 180/443; 701/42
(58) Field of Search ................................. 318/254, 256, 318/280, 287, 293, 139, 430, 722, 727, 700, 800, 803, 806–808, 609, 610, 432, 433; 180/410, 443, 444, 446, 6.44, 6.48, 6.5; 701/41–43

(56) References Cited

U.S. PATENT DOCUMENTS

| | | | | |
|---|---|---|---|---|
| 5,631,529 A | * | 5/1997 | Shimizu et al. | 318/432 |
| 5,844,387 A | * | 12/1998 | Mukai et al. | 318/432 |
| 5,894,204 A | * | 4/1999 | Kumita | 318/364 |
| 6,426,602 B1 | * | 7/2002 | McCann et al. | 318/432 |
| 6,456,030 B1 | * | 9/2002 | Masaki et al. | 318/700 |
| 6,504,336 B2 | * | 1/2003 | Sakamaki | 318/727 |
| 6,608,456 B2 | * | 8/2003 | Imai et al. | 318/254 |

FOREIGN PATENT DOCUMENTS

| | | |
|---|---|---|
| JP | 2959957 | 7/1999 |
| JP | 2001-106099 | 4/2001 |

* cited by examiner

*Primary Examiner*—David Martin
*Assistant Examiner*—Eduardo Colon Santana
(74) *Attorney, Agent, or Firm*—Merchant & Gould P.C.

(57) ABSTRACT

An electric power steering apparatus includes a steering torque detector, a brushless motor PWM-driven with a three-phase alternating motor current, a target current setting section for setting a d-axis target current value and a q-axis target current value, motor current detectors for detecting motor current values supplied to the brushless motor, a three-phase AC/d-q coordinate transformation circuit, a first deviation calculation circuit for calculating a deviation of a current value of a q-axis detection signal from the q-axis target current value, a second deviation calculation circuit for calculating a deviation of a direct current value a d-axis detection current signal from the d-axis target current, a motor control section for controlling driving of the brushless motor through a vector control process on the basis of deviation signals outputted from the first and second deviation calculation circuits, and an attenuation device provided in a feedback transmission path of the q-axis detection current signal for attenuating a high frequency noise mixed in the q-axis detection current signal.

7 Claims, 7 Drawing Sheets

ELECTRIC POWER STEERING APPARATUS

FIELD OF THE INVENTION

The present invention relates to an electric power steering apparatus which performs a steering assist operation by applying a torque generated by an electric motor to a vehicle steering system.

BACKGROUND OF THE INVENTION

Electric power steering apparatuses are conventionally known which are adapted to provide a steering power assist by energizing an electric motor in accordance with manual operation of a steering wheel during travel of a motor vehicle. In the electric power steering apparatuses, a steering torque signal from a steering torque detector that detects a steering torque on a steering shaft produced when the steering wheel is turned by the driver and a vehicle velocity signal from a vehicle velocity detector that detects a vehicle velocity are used to control operation of the electric motor under the control of a motor controller so as to generate a steering power assist to thereby reduce necessary steering power to be applied by the driver. In operation, the motor controller sets a target current value to be supplied to the electric motor on the basis of the steering torque signal and vehicle velocity signal, determines a difference between a target current signal indicative of the target current value and a motor current signal outputted from a motor current detector that detects a motor current actually flowing through the motor, and performs a compensating operation using a proportional plus integral control action (PI control) to thereby generate a drive control signal for controlling driving operation of the motor.

In an actual arrangement of the electric power steering apparatus, the motor is disposed near the steering shaft to ensure transmission of a rotational force from the motor to the steering shaft, and a circuit board having electronic circuits formed thereon to form the motor controller is associated with the motor. The electronic circuits of the motor controller are disposed inside an engine room with bad noise environment. Furthermore, various mechanical or electric switch elements that form a source of high frequency noises due to their on-off operation are disposed near the electronic circuits. With this arrangement, a PI control circuit, for example, of the motor controller is highly liable to be influenced by the high frequency noises, and the motor current signal that is detected by the motor current detector and is fed back to the motor controller is likely to entrain an external high frequency noise. When a high frequency noise is mixed in or superposed on the motor current signal as an external disturbance, such external disturbance component (high frequency noise) will alter the rotational force of the motor, thus making the steering power assist unstable. Unstable steering power assist provides a deteriorated steering feeling.

To deal with this problem, the present assignee has proposed a solution which, as disclosed in Japanese Patent No. 2959957, includes an attenuation device or attenuator provided in a signal path connecting a motor current detector and a motor controller, so as to attenuate or reduce a high frequency noise. More specifically, the attenuator is disposed between the motor current detector and a PI control section of the motor controller, and the filtering characteristic (frequency characteristic) of the attenuator is determined such that current noises of frequencies sufficiently higher than those of usual motor currents occurring during PWM (pulse-width modulation) control operation of the motor controller can be attenuated.

On the other hand, in recent years a brushless motor has been used in the electric power steering apparatus as a motor for providing a steering power assist. In one example shown in Japanese Patent Laid-open Publication No. 2001-106099, a three-phase brushless motor is used. In an electric power steering apparatus equipped with such three-phase brushless motor, if an attempt is made to avoid the occurrence of the aforementioned problem caused due to mixing of an external disturbance (high frequency noise) in the motor current, a similar attenuator must be provided in each of three signal paths interconnecting the respective motor current detectors and corresponding PI control sections of the motor controller that are provided in pairs for the respective phases of the three-phase brushless motor.

In the case where a three-phase brushless motor is used as a steering power assist motor of the electric power steering apparatus in such a manner as shown in Japanese Patent Laid-open Publication No. 2001-106099, a deviation of the detected motor current from the target motor current must be determined for each of the U-phase, V-phase and W-phase of the brushless motor for the purpose of performing the PI control. Thus, when a high frequency noise is to be reduced, three attenuation devices or attenuators must be provided one for each of the U-, V- and W-phase. If these attenuators are provided by way of hardware, a difficulty may arise that due to an increased number of parts, the motor controller becomes large in size and is uneasy to find a place for installation thereof within an internal space of the engine room. Alternatively, if the three attenuators are realized by way of software, a lengthy computer program adapted to be processed by a CPU (central processing unit) of the controller must be provided. In the latter case, if a low performance CPU is used, it requires a relatively long time to carry out arithmetic and logic operations. Thus, the responsiveness of the electric power steering apparatus is relatively low and the steering feeling is deteriorated. Conversely, if a high performance CPU is used, the cost of the controller increases.

In an electric power steering apparatus equipped with a three-phase brushless motor, a three-phase alternating current is used as a motor current to be supplied to the brushless motor for driving the same. In order to control the alternating motor current, the effective value of the alternating motor current must be controlled in accordance with the amount of steering power assist, and at the same time, the frequency of the alternating motor current must be controlled in accordance with the steering speed. If an attenuation device or attenuator for reducing high frequency noises is provided in a feedback loop of the motor current signal extending from a motor current detector and a PI control section of the motor controller, the attenuator will be designed to have a frequency characteristic which is capable of removing high frequency components related to the high frequency noises. In this instance, however, a risk may occur depending on the frequency characteristic of the attenuator that the alternating motor current required to generate steering assist power is attenuated or decreased by the attenuator. Especially when the steering wheel is quickly turned lock to lock in several times (high-speed steering operation), the frequency of the alternating motor current may rapidly increase to such an extent that the frequency of a motor current signal detected by the motor current detector falls in a range of frequencies of the high frequency noises. In this instance, due to the frequency characteristic of the attenuator, the motor current signal is attenuated at the same time high frequency components (high frequency noises) are attenuated. With this attenuation of the motor current, the steering assist power is caused to vary and the steering feeling is deteriorated.

Especially in case where the frequencies of the alternating motor current that is used for driving the brushless motor to provide a steering power assist are included in a frequency range of the high frequency noises, it is substantially impossible to attenuate the high frequency noises alone because the high frequency noises are mixed in the motor current signal. Thus a smooth steering feeling is difficult to obtain.

The attenuator shown in Japanese Patent No. 2959957 is used in combination with a conventional dc motor having brushes and not with a brushless motor. Furthermore, in this Japanese Patent, use of the attenuator is not based on the assumption that a range of frequencies of the high frequency noises may contain frequencies of the motor current. It is therefore logically impossible to use the attenuator of the Japanese Patent in combination with a brushless motor without a teaching of the present invention.

SUMMARY OF THE INVENTION

It is accordingly an object of the present invention to provide an electric power steering apparatus which, when a high frequency noise is mixed in a motor current signal used for driving a brushless motor, is capable of removing the high frequency noise without increasing the size and cost of the apparatus, thus preventing fluctuations of steering assist power from occurring and providing a smooth steering feeling.

Another object of the present invention is to provide an electric power steering apparatus which, even when frequencies of a three-phase alternating motor current for driving a brushless motor are included in a range of frequencies of high frequency noises, is capable of effectively attenuating the high frequency noises alone without affecting the motor current thereby to ensure a smooth steering feeling at all times.

According to the present invention, there is provided an electric power steering apparatus comprising steering torque detecting means for detecting a steering torque produced in accordance with operation of a steering wheel and generating a steering torque signal corresponding to the detected steering torque, a brushless motor PWM-driven with motor currents to apply a steering assist torque to a steering system, the motor currents being at least three alternating currents having phase displacements in relation to one another, target current setting means for setting a first target current value and a second target current value, the second target current value being determined on the basis of at least the steering torque signal, motor current detecting means for detecting motor current values supplied to the brushless motor and generating motor current signals corresponding to the detected motor current values, an AC/DC converter for converting the motor current signals into a first detection current signal and a second detection current signal, the motor current signals being indicative of the at least three alternating current values with phase displacements, and the first and second detection current signals being indicative of direct current values, first deviation calculation means for calculating a deviation of the direct current value represented by the first detection current signal from a the first target current value and producing a deviation signal indicative of the calculated deviation, second deviation calculation means for calculating a deviation of the direct current value represented by the second detection current signal from the second target current value and producing a deviation signal indicative of the calculated deviation, motor control means for controlling driving of the brushless motor through a control process on the basis of the deviation signals outputted from the first and second deviation calculation means, and attenuation means provided in a feedback transmission path of the second detection current signal for attenuating a high frequency noise mixed in the second detection current signal.

The second detection current signal is a feedback signal used for achieving a desired control of a controlled object (assist steering torque produced by the brushless motor) related to the second target current value, and this signal represents a direct current value. The second target current relates to the assist steering torque (torque component) outputted from the brushless motor. By the single attenuation device provided in the feedback transmission path of the second detection current signal, a high frequency noise mixed in the second detection current signal is removed with the result that the rotary motion of the brushless motor PWM driven with the three-phase alternating current is stabilized. This ensures that the brushless motor produces a steering assist torque in a stable manner and provides an improved steering feeling. Furthermore, even in the case of a brushless motor having more than three phases, necessary number of the attenuation device is only one because the attenuating device is disposed in the feedback transmission path of a dc current signal provided behind the AC to DC conversion. By thus providing the attenuation device in a direct current control system, it is possible to remove the high frequency noise only without affecting the detection signal related to the motor current.

It is preferable that the control process achieved in the motor control means is a vector control process, the first target current value and the first detection current signal are related to a d-axis current in a d-q coordinate system, the second target current value and the second detection current signal are related to a q-axis current in the d-q coordinate system, and the AD/DC converter comprises a three-phase AC/d-q coordinate transformation means. The vector control process, when employed in a control of the brushless motor, is able to perform a precise torque control at high speeds. Thus, the vector control process is a control process optimal to the electric power steering apparatus.

In one preferred form of the present invention, the electric power steering apparatus comprises steering torque detecting means for detecting a steering torque produced in accordance with operation of a steering wheel and generating a steering torque signal corresponding to the detected steering torque, a brushless motor PWM-driven with motor currents to apply a steering assist torque to a steering system, the motor currents being at least three alternating currents having phase displacements in relation to one another, target current setting means for setting a d-axis target current value and a q-axis target current value, the q-axis target current value being determined on the basis of at least the steering torque signal, motor current detecting means for detecting motor current values supplied to the brushless motor and generating motor current signals corresponding to the detected motor current values, a polyphase AC/d-q coordinate converter for converting the motor current signals outputted from the motor current detecting means to a d-axis detection current signal and a q-axis detection current signal, the d- and q-axis detection current signals being indicative of direct current values, first deviation calculation means for calculating a deviation of the direct current value represented by the q-axis detection signal from the q-axis target current value and generating a deviation signal indicative of the calculated deviation, second deviation calculation means for calculating a deviation of the direct current value represented by the d-axis detection current signal from the d-axis target current and generating a deviation signal indicative of the calculated deviation, motor control means for controlling driving of the brushless motor through a vector control process on the basis of the deviation signals outputted from the first and second deviation calculation means, and attenuation means provided in a feedback transmission path of the q-axis detection current signal for attenuating a high frequency noise mixed in the q-axis detection current signal.

It is preferable that the motor currents are a three-phase alternating current, the motor current detection means detects at least two current values of the three alternating currents having phase displacements supplied to the brushless motor and generates motor current signals indicative of the detected at least two motor current values, and the polyphase AC/d-q coordinate converter comprises a three-phase AC/d-q coordinate transformation means.

The electric power steering apparatus may further include second attenuation means provided in a feedback path of the d-axis detection current signal for attenuating a high frequency noise mixed in the d-axis detection current signal. With this arrangement, since the high frequency noise mixed in the d-axis current (a component relating to the magnetic flux of the brushless motor) is attenuated; it is possible to further decrease fluctuations of the steering assist torque and improve the steering feeling.

The attenuation means preferably comprises a phase-lag compensation element or a phase-lead-lag compensation element.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

Figure 1:
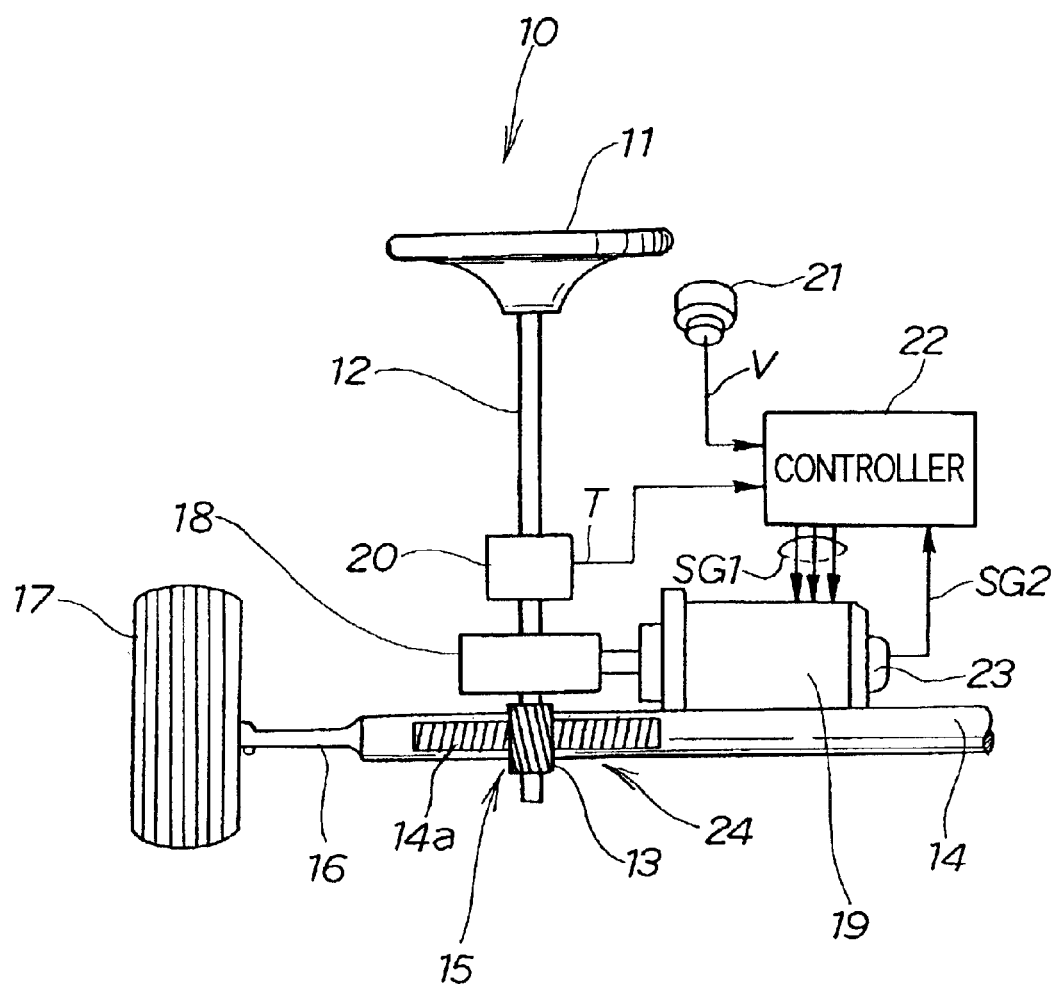
FIG. 1 is a diagrammatical view showing the general arrangement of an electric power steering apparatus according to the present invention.

Referring now to the drawings and FIG. 1 in particular, there is shown the general arrangement of an electric power steering apparatus 10 embodying the present invention. The electric power steering apparatus 10 is incorporated in a passenger car, for example, and so constructed as to apply steering assist power (assist steering torque) to a steering shaft 12, for example, connected to a steering wheel 11. The steering wheel 11 is connected to an upper end of the steering shaft 12, and a lower end of the steering shaft 12 has a pinion gear 13 mounted thereon. The pinion gear 13 is in mesh with a rack gear 14a formed on a rack shaft 14. The pinion gear 13 and the rack gear 14a together form a rack-and-pinion mechanism 15. The rack shaft 14 is connected at opposite ends (one end being shown) with tie rods 16 each of which is connected at an outer end with one front wheel 17. The steering wheel 12 is also connected via a power transmission mechanism 18 to a brushless motor 19. The brushless motor 19 operates to generate rotational power (torque) which in turn is applied via the power transmission mechanism 18 to the steering shaft 12 as steering assist power.

The electric power steering apparatus 10 also includes a steering torque detecting unit or detector 20 associated with the steering shaft 12 for detecting a steering torque applied to the steering shaft 12 when the driver turns the steering wheel 11 to undertake a steering operation, a vehicle velocity detecting unit or detector 21 for detecting a velocity of the vehicle, and a control unit or controller 22 basically formed by a microcomputer. The controller 22 is supplied with a steering torque signal T from the steering torque detector 20 and a vehicle velocity signal V from the vehicle velocity detector 21 and generates, on the basis of steering-torque-related information and vehicle-velocity-related information, a drive control signal SG1 for controlling rotating operation of the brushless motor 19. The brushless motor 19 is associated with a motor rotational angle detecting section or unit 23, such as a resolver. A rotational angle signal SG2 outputted from the motor rotational angle detector 23 is fed back to the controller 22. The rack-and-pinion mechanism 15 is housed in a gearbox 24 (FIG. 2).

The electric power steering apparatus 10 of the foregoing construction can be formed by modifying the structure of a conventional steering system to further include the aforesaid steering torque detector 20, vehicle velocity detector 21, controller 22, brushless motor 19 and power transmission mechanism 18.

With the foregoing arrangement of the electric power steering apparatus 10, when the driver turns the steering wheel 11 to change the direction of travel of the motor vehicle while running, a rotary motion of the steering shaft 12 caused by a steering torque applied thereto is converted by the rack-and-pinion mechanism 15 into a linear reciprocating motion of the rack shaft 14 to thereby change the travel direction of the front wheels 17 via the tie rods 16. In this instance, the steering torque detector 20 associated with the steering shaft 12 detects a steering torque corresponding to a muscular effort or force applied by the driver to the steering wheel 11 and converts the detected steering torque into an electric steering torque signal T. The steering torque signal T is supplied to the controller 22. At the same time, the vehicle velocity detector 21 detects a velocity of the vehicle and converts the detected vehicle velocity into an electric vehicle velocity signal V. The vehicle velocity signal V is supplied to the controller 22. The controller 22 generates a motor current (Iu, Iv, Iw) with difference phases for driving the brushless motor 19 on the basis of the steering torque signal T and the vehicle velocity signal V. The brushless motor 19 is a three-phase brushless motor, and the motor current flowing through the brushless motor 19 is a three-phase alternating current having three phases U, V and W. The drive control signal SG1 is in the form of a motor current Iu, Iv, Iw of three phases of alternating current. The brushless motor 19 driven with the motor current applies steering assist power to the steering shaft 12 via the power transmission mechanism 18. By thus driving the brushless motor 19, necessary steering power to be applied by the driver to the steering wheel 11 can be reduced.

Figure 2:
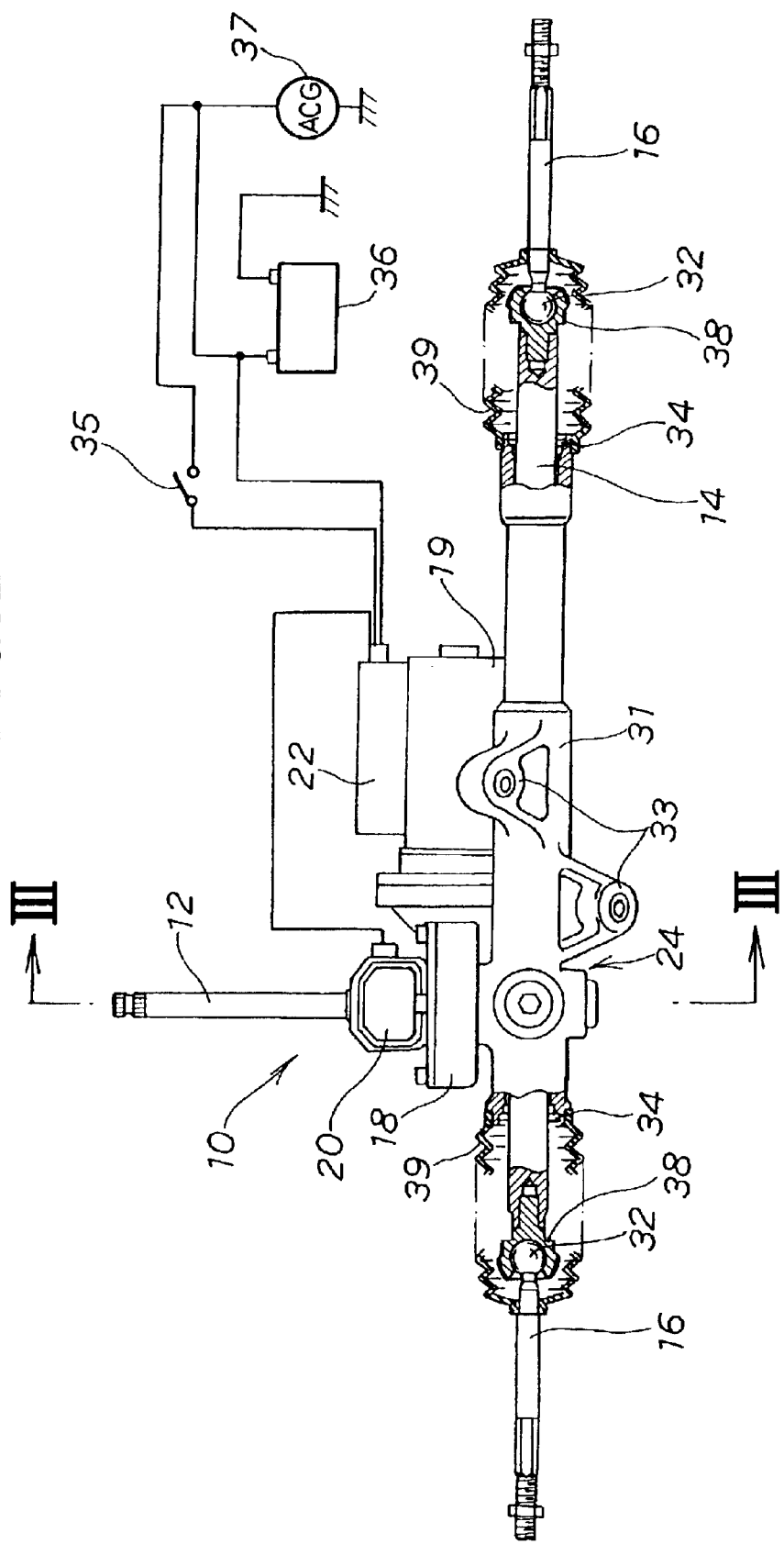
FIG. 2 is a diagrammatical view showing the connection between a main part of a mechanical system and an electric system of the electric power steering apparatus.

FIG. 2 schematically illustrates the connection between a main part of a mechanical system and an electric system of the electric power steering apparatus, with left and right end portions of the rack shaft 14 shown in cross section for clarity. The rack shaft 14 is slidably received in a tubular housing 31 such that the rack shaft 14 is movable in the axial direction thereof. Opposite ends of the rack shaft 14 project outward from the housing 13, and ball joints 32 are screwed to the opposite ends of the rack shaft 14. The left and right tie rods 16 are connected to the ball joints 32, respectively. The housing 31 has a plurality of brackets 33 adapted to be attached to a body (not shown) of the motor vehicle, and stoppers 38, 38 formed at opposite ends thereof for a purpose described below.

As shown in FIG. 2, the electric system includes an ignition switch 35, an onboard battery 36 and an ac current generator or dynamo 37 associated with an engine (not shown) of the motor vehicle. The dynamo 37 starts to generate electric power when the engine is started. The controller 22 is supplied with necessary electric power from the battery 36 or the dynamo 37. The controller 22 is associated with the brushless motor 19. Reference numeral 38 shown in FIG. 2 denotes a rack end engageable with a corresponding one of the stoppers 34 to limit further axial movement of the rack shaft 14 in one direction. Reference numeral 39 denotes a rubber boot provided at each end of the tubular housing 31 for protecting the interior of the gearbox 24 from getting a foreign matter, such as water, mud or dust.

Figure 3:
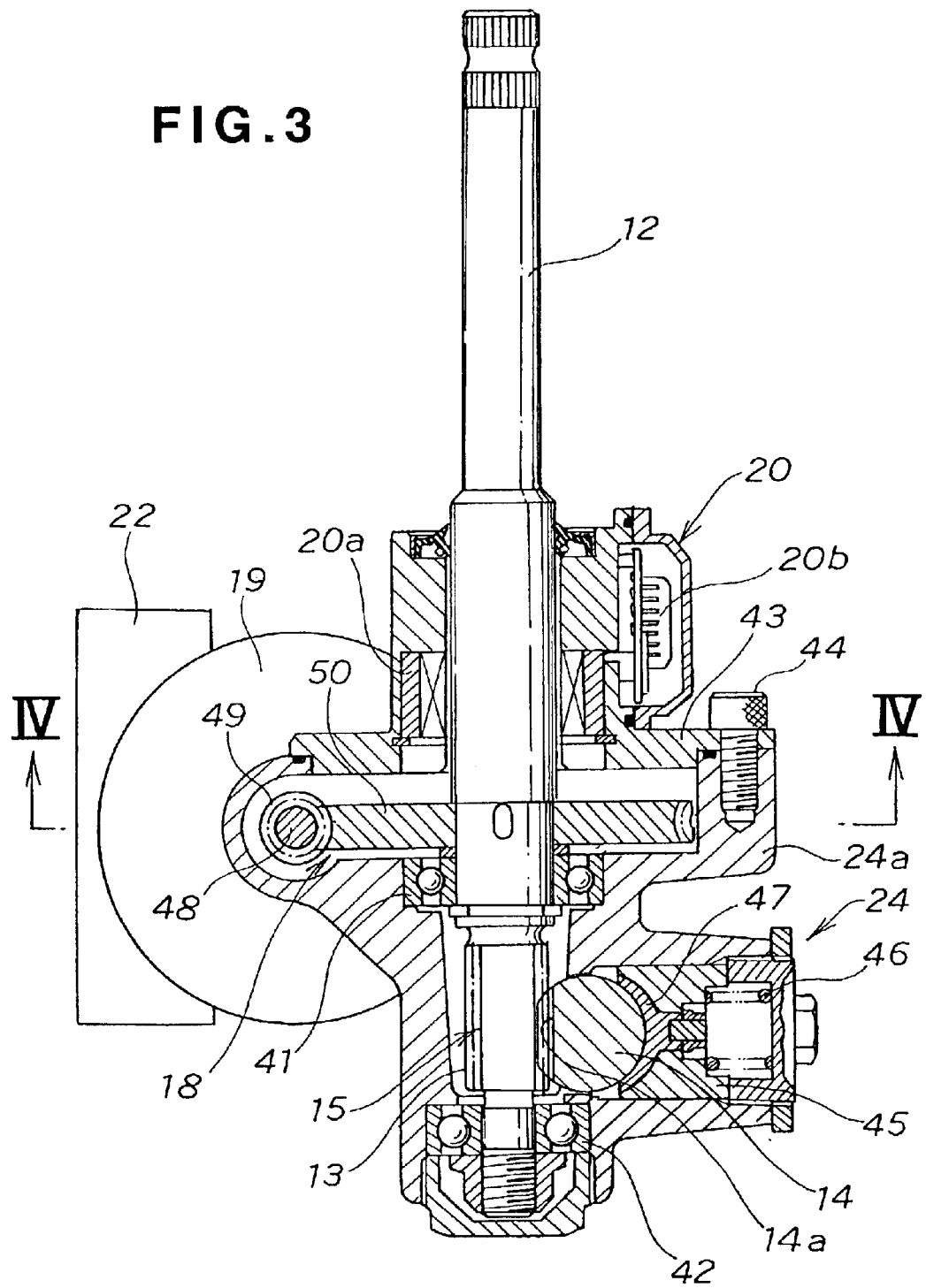
FIG. 3 is a cross-sectional view taken along line III—III of FIG. 2.

FIG. 3 shows in cross section structural details of a support mechanism for the steering shaft 14, steering torque sensor 20, power transmission mechanism 18 and rack-and-pinion mechanism 15 together with an arrangement of the brushless motor 19 and the controller 22.

As shown in FIG. 3, the gearbox 24 is formed by a part 24a of the housing 24, and the steering shaft 12 is rotatably supported by a pair of ball bearings 41 and 42 within the housing part 24a. The housing part 24a accommodates within it the rack-and-pinion mechanism 15 and the power transmission mechanism 18. The housing part 24a has an opening at an upper end thereof, which is closed by a lid 43 bolted to the housing part 24a. The steering torque detector 20 is assembled with an upper part of the lid 43. The pinion 15 formed on a lower end portion of the steering shaft 12 is located between the ball bearings 41, 42. The rack shaft 14 is guided by a rack guide 45 and forced toward the pinion 13 by a backing member 47, which is urged by the force of a compression coil spring 46. The power transmission mechanism 18 is composed of a worm gear 49 fixedly mounted on a power transmission shaft 48 and a worm wheel 50 fixedly mounted on the steering shaft 12. The power transmission shaft 48 is coupled with an output shaft of the brushless motor 19. The steering torque detector 20 is composed of a steering torque sensor 20a disposed around the steering shaft 12 and an electronic circuit 20b for electrically processing a detection signal output from the steering torque sensor 20a. The steering torque sensor 20a is attached to the lid 43.

Figure 4:
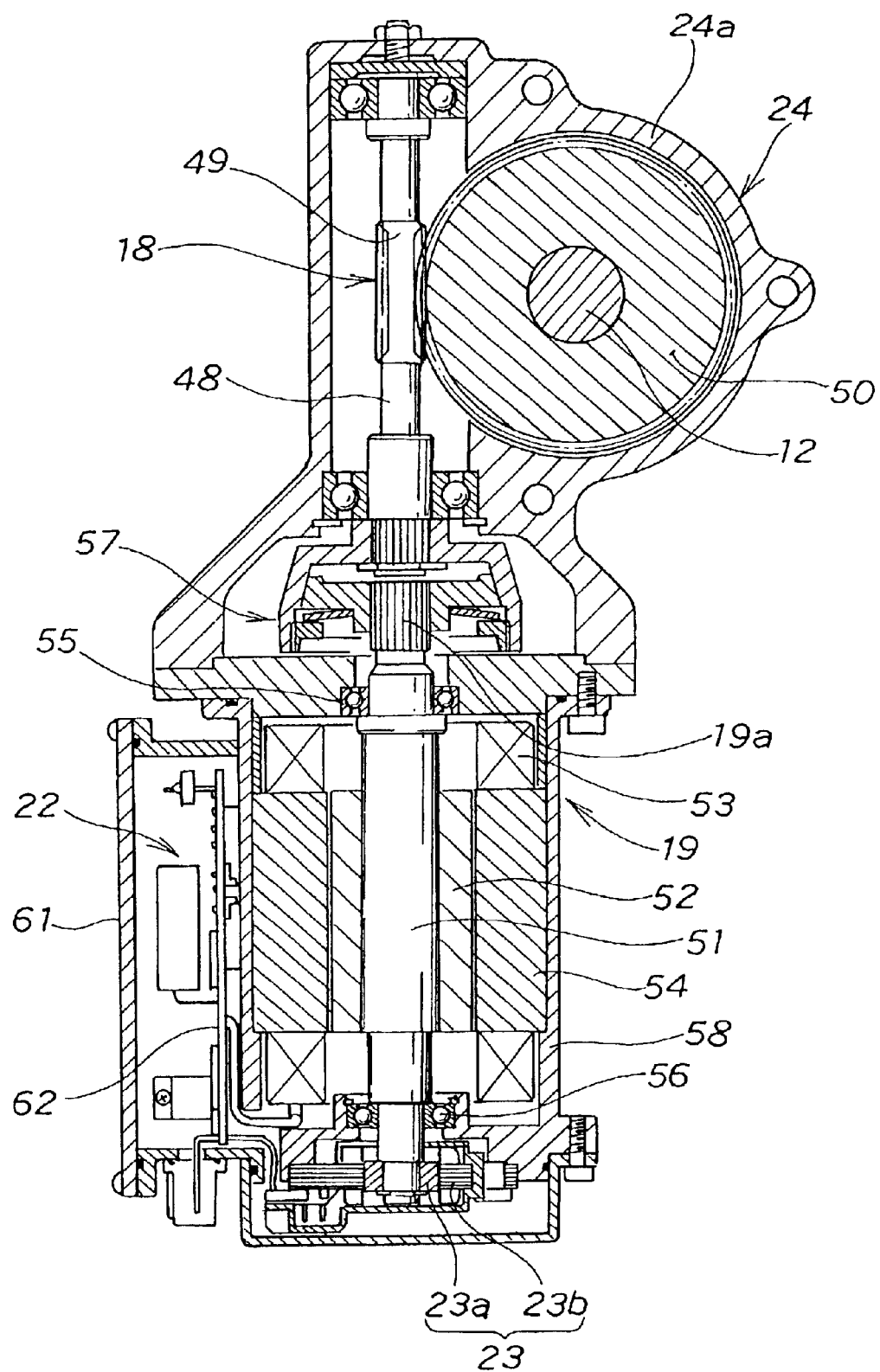
FIG. 4 is a cross-sectional view taken along line IV—IV of FIG. 2.

FIG. 4 is a cross-sectional view showing an internal structure of the brushless motor 19 and the controller 22. As shown in this figure, the brushless motor 19 has a rotor 52 of permanent magnet fixedly mounted on a rotating shaft 51 and a stator 54 disposed around the rotor 52. The stator 54 has a stator winding 54. The rotating shaft 51 is rotatably supported by a pair of ball bearings 55 and 56. The rotating shaft 51 has a fore-end (upper end in FIG. 4) forming an output shaft 19a of the brushless motor 19. The output shaft 19a of the brushless motor 19 is connected with the power transmission shaft 48 via a torque limiter 57 for transmission of rotational power from the brushless motor 19 to the power transmission shaft 48. The worm gear 49 is fixedly mounted to the power transmission shaft 48 and this gear 49 is held in mesh with the worm wheel 50. The rotating shaft 51 has a rear end (lower end in FIG. 4) on which the motor rotational angle detector (position sensor) 23 is mounted for detecting a rotational angle (rotating position) of the rotor 52 of the brushless motor 19. The motor rotational angle detector 23 includes a rotor 23a fixedly mounted on the rotating shaft 51, and a detecting element 23b that detects a rotational angle of the rotor 23a by using a magnetic action. One example of such motor rotational angle detector 23 is a resolver, as mentioned above. The stator winding 53 of the stator 54 is supplied with a motor current Iu, Iv, Iw formed by three-phase alternating current. The foregoing parts or components of the brushless motor 19 are housed in a motor case 58.

The controller 22 is installed in a control box 61 mounted on an outer surface of the motor case 58. The controller 22 is formed by a microcomputer, as stated above, and includes a single circuit board 62 on which are mounted various electronic circuit components, such as a one-chip microprocessor (CPU) and its peripheral circuits, predrive circuit, FET (field-effect transistor) bridge circuit, inverter circuit and so on. The controller 22 supplies the stator winding 53 of the brushless motor 19 with the motor current Iu, Iv, Iw (drive control signal SG1). The controller 22 is supplied with a rotational angle signal SG2 outputted from the motor rotational angle detector 23 as representing a rotational angle of the rotating shaft 51.

Figure 5:
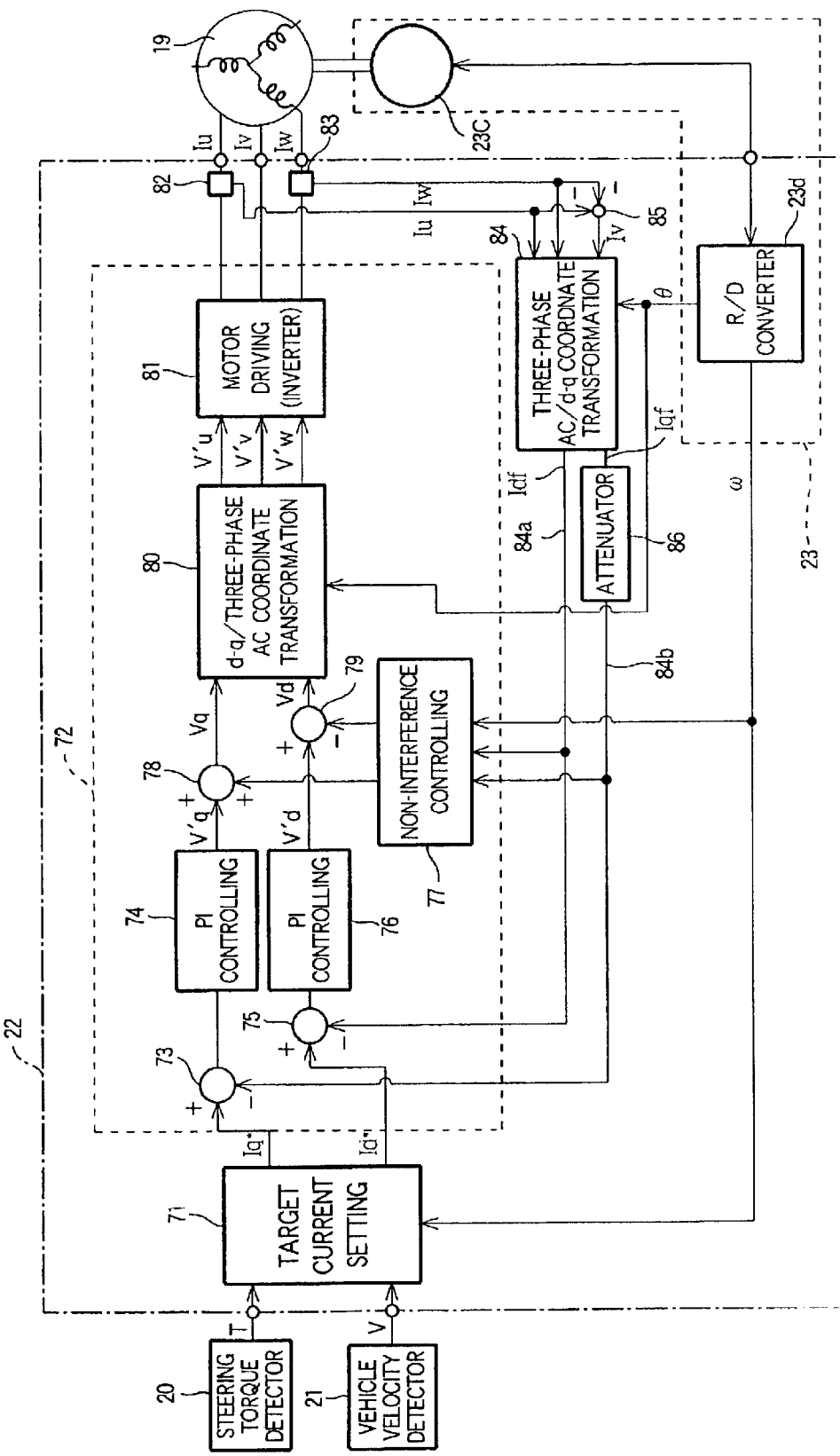
FIG. 5 is a block diagram showing an electric circuitry of a control unit of the electric power steering apparatus.

As shown in FIG. 5, the controller 22 generally comprises a target current setting section 71, a motor control section 72, a first feedback path or loop for a detection signal related to the motor current, and a second feedback path or loop for a detection signal related to the motor rotational angle. As previously mentioned, the motor used in the electric power steering apparatus for generating steering assist power is a three-phase brushless motor 19. The brushless motor 19 requires control of the amount of motor current which is performed according to the rotational angle of the rotor 52 (rotating shaft 51). To enable this, motor current detecting units or detectors 82, 83 are provided on two wires of a power line to the brushless motor 19 so as to detect the amounts of motor currents (current components) Iu and Iw flowing through the two power line wires, and at the same time, the motor rotational angle detector 23 is provided to detect a motor rotational angle of the brushless motor 19. The brushless motor 19 is PWM-driven under operations of the target current setting section 71 and motor control section 72 using respective detection signals outputted from the motor rotational angle detector 23 and motor current detectors 82, 83.

The motor rotational angle detector 23 associated with the brushless motor 19 is composed of a resolver 23c assembled with the rotating shaft 51 of the brushless motor 19, and an RD (resolver-digital) converter 23d. The RD converter 23d supplies an exciting current to the resolver 23c, and the resolver 23c supplies an output signal to the RD converter 23d. The RD converter 23d generates, on the basis of an output signal from the resolver 23c, a rotational angle signal θ indicative of the rotational position of the rotor 52 of the brushless motor 19 and an angular velocity signal ω. The angular velocity signal ω is fed back to the target current setting section 71.

In the controller 22, the steering torque signal T outputted from the steering torque detector 20 and the vehicle velocity signal V outputted from the vehicle velocity detector 21 are inputted in the target current setting section 71. The target current setting section 71 determines a q-axis target current value Iq* and a d-axis target current value Id* on the basis of the steering torque signal T and vehicle velocity signal V and outputs the determined target current values Iq*, Id*.

In the illustrated embodiment, the motor control section 72 is arranged to perform torque control of the brushless motor 19 through a vector control process for the purpose of obtaining a high-speed and accurate torque response. The vector control process will be described later in greater detail.

Torque of the three-phase brushless motor 19 is determined by the magnitude (torque) and phase of each of the motor currents Iu, Iv, and Iw of three phases of alternating current. According to the vector control process, the motor current supplied to the stator winding 53 is divided into a current component (magnetic flux current) that creates a magnetic flux in the direction of a main magnetic flux established inside the brushless motor 19, and a current component (torque current) that leads the magnetic flux current by 90 degrees in phase and directly controls the motor torque, and these two current components (i.e., the magnetic flux current and the torque current) are controlled independently from each other. When torque control of the brushless motor 19 is undertaken by the vector control process, a dq axes coordinate system is defined inside the brushless motor 19. In the dq axes coordinate system, the main magnetic flux direction which extends from the center of a cross-sectional area of the rotor 52 including the rotating shaft 51 toward the north pole of the magnet is defined as a d-axis (magnetic flux axis), and a direction which leads the d-axis by 90 degrees in phase is defined as q-axis (torque axis). The magnetic flux current that creates a magnetic flux in the d-axis direction is defined as a d-axis current, while the torque current that creates a magnetic flux in the q-axis direction is defined as a q-axis current. The d-axis current Id and q-axis current Iq are related to the motor currents of three phases of alternating current (i.e., U-phase current Iu, V-phase current Iv and W-phase current Iw) by using a rotational angle of the main magnetic flux relative to the stator according to a well-known transformation. The d-axis current and the q-axis current are bi-axial direct currents in the dq-axes coordinate system. Thus, in the vector control process, moment currents Iu, Iv and Iw of three phases that form the motor current of the brushless motor 19 are converted into bi-axial currents Id and Iq in the dq-axes coordinate system. The d-axis current Id and the q-axis current Iq both in the form of a direct current are then used in a control process achieved in the motor control section 72.

The q-axis target current value Iq* and the d-axis target current value Id* that are outputted from the target current setting section 71 give target values for the motor currents Iu, Iv and Iw to be supplied to the brushless motor 19. These target current values Iq* and Id* are input into the motor control section 72. In the motor control section 72, the q-axis target current value Iq* is subjected to a subtracting operation achieved at a deviation calculation part or circuit 73 where a current value of a feedback current signal Iqf (q-axis detection current signal related to the motor current) is subtracted from the q-axis target current value Iq* to thereby determine a deviation and generate a deviation signal indicative of the determined deviation. The deviation signal is fed into a PI (proportional plus integral) control part or controller 74. The PI controller 74 performs a PI (proportional plus integral) compensation process on the deviation signal and outputs a q-axis target voltage Vq' which follows up the q-axis target current value. On the other hand, the d-axis target current value Id* is subjected to a subtracting operation achieved at a deviation calculating part or circuit 75 where a current value of a feedback current signal Idf (d-axis detection current signal related to the motor current signal) is subtracted from the d-axis target current value Id* to thereby determine a deviation and generate a deviation signal indicative of the determined deviation. The deviation signal is fed into a PI controller 76. The PI controller 76 performs a PI compensation process of the deviation signal and outputs a d-axis target voltage Vd' which follows up the d-axis target current. The q-axis target voltage Vq' and the d-axis target voltage Vd' are corrected into a corrected q-axis target voltage Vq and a corrected d-axis target voltage Vd, respectively, through a compensation achieved by a combination of an non-interference control part or controller 77 and an adder 78 and through a compensation achieved by a combination of the non-interference controller 77 and a subtractor 79. The corrected q- and d-axis target voltages Vq and Vd are supplied to a dq three-phase converting part or converter 80.

The non-interference controller 77, on the basis of the d- and q-axis detection currents Idf and Iqf and the angular velocity signal ω of the rotor 52, calculates a non-interference control correction so as to determine the d- and q-axis target voltages Vd and Vq. The angular velocity signal co of the rotor 52 is supplied from the RD converter 23d.

The dq three-phase converter (DC to AC converter) 80 converts the d- and q-axis target voltages Vd and Vq into three-phase target voltages Vu', Vv' and Vw' through a conversion process based on a predetermined transformation. The three-phase target voltages Vu', Vv' and Vw' are supplied from the dq three-phase converter 80 to a motor driving part or driver 81.

The motor driver 81 includes a PWM (pulse-width modulated) voltage generator and an inverter circuit (neither shown). The PWM voltage generator generates PWM control voltage signals UU, VU and WU corresponding to the three-phase target voltages Vu', Vv' and Vw', respectively, and outputs the PWM control voltage signals UU, VU and WU to the inverter circuit. The inverter circuit generates three-phase alternating currents (i.e., motor currents) Iu, Iv and Iw corresponding to the PWM control voltage signals UU, VU and WU, respectively. The motor currents Iu, Iv and Iw of three phases are supplied to the brushless motor 19. The motor currents Iu, Iv and Iw are sinusoidal currents that are used for PWM-driving of the brushless motor 19.

A power line to the brushless motor 19 has three wires, two of which are equipped with the motor current detectors 82, 83. The motor current detectors 82, 83 detect two motor current values Iu and Iw among three motor currents Iu, Iv and Iw of different phases and output the detected motor current values Iu and Iw to a three-phase dq converting part or converter (AD to DC converter) 84. The detected motor current values Iu and Iw are also supplied to an adder 85 provided in front of the three-phase dq converter 84. The adder 85 calculates a motor current value Iv of the remaining phase on the basis of the detected motor current values Iu, Iw. The three-phase dq converter 84 converts the motor current values Iu, Iv and Iw of three-phase alternating currents into a d-axis direct current value Idf and a q-axis direct current value Iqf of two different phases by using a predetermined transformation composed of trigonometric functions and a rotational angle signal θ supplied from the RD converter 23d. The d- and q-axis direct current values Idf and Iqf correspond to the aforesaid d-axis detection current signal and q-axis detection current signal, respectively, both related to the motor current.

The d-axis detection current signal Idf outputted from the three-phase dq converter 84 is directly fed back through a feedback path or loop 84a to the deviation calculation circuit 75 and the non-interference controller 77. On the other hand, the q-axis detection current signal Iqf outputted from the three-phase dq converter 84 is fed back to the deviation calculation circuit 73 and the non-interference controller 77 via an attenuation device or attenuator 86 provided in a feedback path or loop 84b of the q-axis detection current signal Iqf The attenuator 86 is designed to have an attenuation characteristic which is represented by a filtering characteristic (frequency characteristic) capable of blocking passage of high frequency components (that form an external disturbance, as discussed above in conjunction with the admitted prior art) thereby to attenuate the high frequency noises. A frequency range of the attenuator 86 is determined depending on frequencies of the high frequency noises desired to be attenuated or removed. The attenuator 86 preferably comprises a phase-lag compensation element or a phase-lead-lag compensation element.

Figure 6:
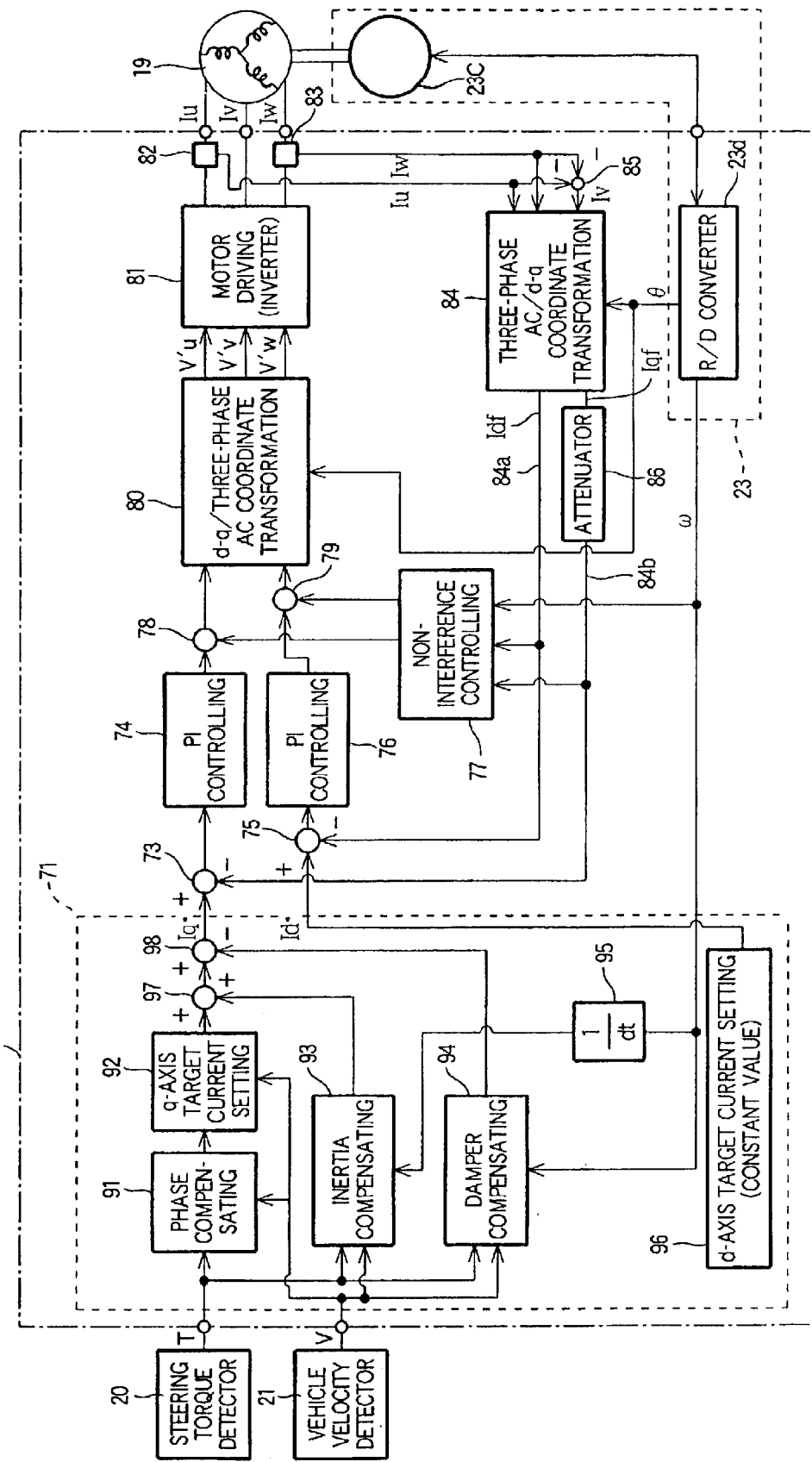
FIG. 6 is a block diagram showing a detailed structure of a target current setting section of the control unit shown in FIG. 5.

FIG. 6 is a view similar to FIG. 5, but showing the arrangement of the target current setting section 71 in detail. Other parts are designated by the same reference characters used in FIG. 5 and a further description thereof can, therefore, be omitted. As shown in FIG. 6, the target current setting section 71 includes a phase compensating part or compensator 91, a q-axis target current setting part or setter 92, an inertia compensating part or compensator 93, a damper compensating part or compensator 94, a differentiation processing part or differentiator 95, a d-axis target current setting part or setter 96, adder 97 and a subtractor 98. The steering torque signal T is inputted to the phase compensator 91, inertia compensator 93 and damper compensator 94. The vehicle velocity signal V is inputted to the phase compensator 91, q-axis target current setter 92, inertia compensator 93 and damper compensator 94. The damper compensator 94 also receives the rotor angular velocity signal ω. The inertia compensator 93 also receives an angular velocity signal that is obtained by differentiating the rotational angular speed ω at the differentiator 95.

The phase compensator 91 serves to undertake a phase compensating operation based on the steering torque signal T and the vehicle velocity signal V and output a compensated steering torque signal to the q-axis target current setter 92. The inertia compensator 93 generates an inertia compensation signal for an inertia compensation process on the basis of the steering torque signal T, vehicle velocity signal V and angular velocity signal and outputs the inertia compensation signal to the adder 97. The damper compensator 94 generates a damper compensation signal for a damper compensation process on the basis of the steering torque signal T, vehicle velocity signal V and rotational angular speed signal ω and outputs the damper compensation signal to the subtractor 98.

The q-axis target current setter 92 calculates a q-axis target current value on the basis of the compensated steering signal and the vehicle velocity signal V. The q-axis target current value is then added with the inertia compensation signal at the adder 97 and subsequently subtracted by the damper compensation signal at the subtractor 98. As a result, the aforesaid q-axis target current value Iq* is supplied to the deviation calculation circuit 73.

On the other hand, at the d-axis target current setter 96, a d-axis target current of a fixed constant value, such as zero (0), is set. The fixed value is outputted, as a d-axis target current value Id*, to the deviation calculating circuit 75.

The controller 22 is comprised of a microcomputer as previously mentioned and various functional parts of the controller are realized by way of software programming.

In the motor controller (FIG. 5) of the controller 22, the detection signals indicative of the motor currents are taken out through the three-phase AC/d-q converter 84 in the form of a d-axis detection current signal Idf and a q-axis direction current signal Iqf both of which are direct current signals. The d-axis detection current signal Idf is directly fed back to the deviation calculation circuit 75, while the q-axis detection current signal Iqf is fed back through the attenuator 96 to the deviation calculation circuit 73. At the deviation calculation circuits 73, 75, deviations of the respective detection current signals Iqf and Idf from the corresponding target currents Iq* and Id* are determined. Signals indicative of the determined deviations are then processed by the IP controllers 74, 76 and the d-q/three-phase AC converter 80 so as to calculate a PWM duty. Based on the PWM duty thus calculated, the motor driver 81 generates sinusoidal motor currents of three different phases which are supplied to the stator windings 53 of the brushless motor 19 to thereby PWM-drive the brushless motor 19.

When a high frequency noise is mixed in the U-phase motor current detection signal and W-phase motor current detection signal outputted respectively from the motor current detectors 82 and 83, the high frequency noise is kept mixed in or superposed on the d- and q-axis detection current signals Idf and Iqf while the motor current detection signals of three-phase alternating currents are converted by the three-phase AC/d-q converter 84 into the d-axis detection current signal Idf and the q-axis detection current signal Iqf of direct currents. The d-axis detection current signal related to the magnetic flux is fed back to the deviation calculation circuit 75 with the high frequency noise mixed therein. On the other hand, the Q-axis detection current signal related to the torque current (which is a current component relating to the torque of the brushless motor 19) is fed back to the deviation calculation circuit 73 with the high frequency noise attenuated or removed by the attenuator 86. With respect to the torque current (q-axis current), since the brushless motor 19 is controlled on the basis of the deviation signal which is free from the high frequency noise, the steering torque produced by the brushless motor 19 does not undergo fluctuations. Thus, a smooth steering feeling can be obtained.

Even when the frequencies of the motor currents increase up to the frequency range of the high frequency noises, it is possible to attenuate the high frequency noises alone because in the feedback transmission path 84b including the attenuator 86, the detection signal indicative of the motor current have been converted by the three-phase AC/d-q converter 84 to the q-axis detection current signal Iqf of direct current.

Figure 7:
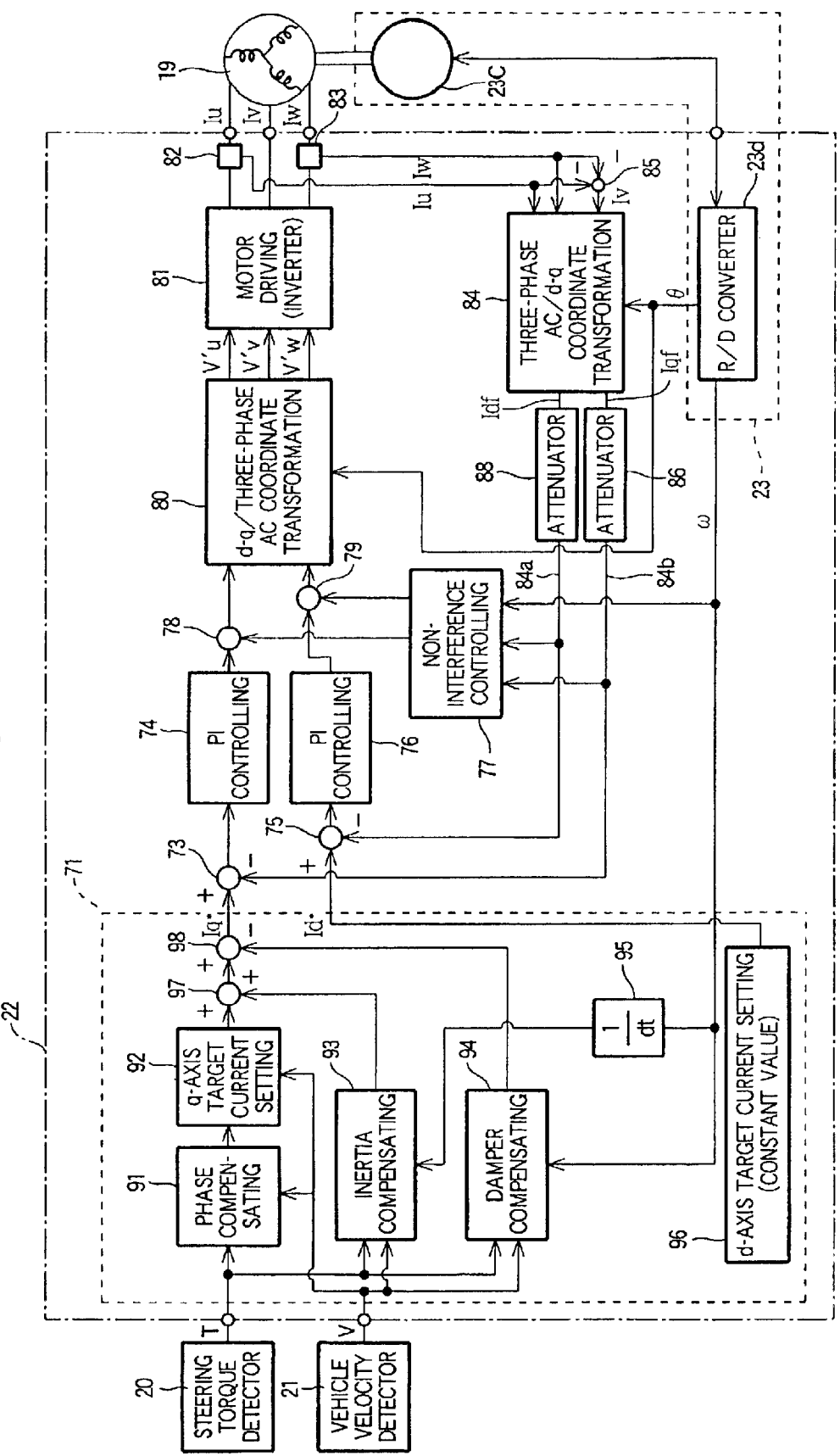
FIG. 7 is a block diagram similar to FIG. 6 of a modified structure according to the invention.

In the embodiment discussed above, the attenuator 86 for attenuating high frequency noises is provided in the feedback path 84b of the q-axis current. The attenuator 86 may be provided also in the feedback path 84a of the d-axis current (magnetic flux current). In FIG. 7, this additional alternator is shown designated as alternator 88. Furthermore, the d-axis target current value should by no means be limited to a fixed value as in the illustrated embodiment but may include a value that can vary according to the q-axis target current value or rotating conditions of the brushless motor 19.

In the illustrated embodiment, the brushless motor 19 is supplied with motor currents of three phases (i.e., three-phase alternating current). The number of phases of the alternating current is not limited to three as in the illustrated embodiment, and six or more phases of alternating current can be used as motor currents for the brushless motor 19. The vector control process in which the brushless motor 19 is supplied with sinusoidal currents may be replaced with any other suitable motor control process provided that the currents used in the motor control section are direct currents converted from the high frequency currents, or alternating currents similar to the direct currents. The sinusoidal currents supplied to the brushless motor may be replaced by currents with rectangular waveform or sinusoidal waveform formed by composition of rectangular waveforms.

As thus for described, the electric power steering apparatus of the present invention includes a brushless motor for generating steering assist power, and a controller for controlling operation of the brushless motor through a control process using direct current signals. A single attenuation device or attenuator is provided between an AC/DC converter and a motor drive control part of the controller and attenuates only a high frequency noise contained in a current component related to the torque of the brushless motor. The number of the attenuator is only one irrespective of the number of phase of the brushless motor, so that the number of parts used in the controller is relatively small. This allows the controller to be constructed in a relatively small size and at a relatively low cost. Furthermore, since the attenuator is provided for attenuating the detected motor current signal of direct current, it is possible to attenuate the high frequency noise only even when the frequency of the alternating motor current supplied to the brushless motor increases. This ensures an effective control of the brushless motor stabilizes the steering torque outputted from the brushless motor and provides a smooth steering feeling.

Additionally, in the motor drive control part of the controller, a vector control process is performed, in which the alternating current supplied to the brushless motor is converted into bi-axial direct currents (d-axis current and q-axis current) with phase displacement of 90 degrees in a d-q coordinate system according to a predetermined transformation using trigonometric functions. The vector control process can readily be achieved by calculation using a microcomputer. This ensures that drive control of the brushless motor is achieved smoothly and speedily. In the case where the brushless motor is supplied with a three-phase alternating current, motor current signals of at least two phases are detected by moor current detectors and then converted by a three-phase AC/d-q coordinate transformation circuit into a d-axis detection current signal and a q-axis detection current signal both indicative of direct currents. With this arrangement, the brushless motor driven with a three-phase alternating current can be controlled speedily and accurately. The attenuator provided in a feedback path of the q-axis direct current signal related to the torque of the brushless motor is able to effectively remove a high frequency noise mixed in the q-axis direct current signal without affecting or attenuating the q-axis direct current signal.

The attenuator may be also provided in a feedback path of the d-axis current related to the magnetic flux of the brushless motor, in which instance a high frequency noise mixed in a current component (d-axis current) relating to the magnetic flux of the brushless motor is also attenuated. This arrangement further reduces fluctuations of the output of the brushless motor and improves the steering feeling.

The attenuator may comprise a phase-lag compensation element or a phase-lead-lag compensation element. The attenuator formed by the phase-lag compensation element is able to reduce the level of the high frequency noise to a desired level. The attenuator formed by the phase-lead-lag compensation element is further able to reduce a high frequency noise of a specific frequency to a desired level, so that it is possible to prevent the control operation of the controller from becoming unstable.

The present disclosure relates to the subject matter of Japanese Patent Application No. 2001-372372, filed Dec. 6, 2001, the disclosure of which is expressly incorporated herein by reference in its entirety.

What is claimed is:

1. An electric power steering apparatus comprising:

steering torque detecting means for detecting a steering torque produced in accordance with operation of a steering wheel and generating a steering torque signal corresponding to the detected steering torque;

a brushless motor PWM-driven with motor currents to apply a steering assist torque to a steering system, the motor currents being at least three alternating currents having phase displacements in relation to one another;

target current setting means for setting a first target current value and a second target current value, the second target current value being determined on the basis of at least the steering torque signal;

motor current detecting means for detecting motor current values supplied to the brushless motor and generating motor current signals corresponding to the detected motor current values;

an AC/DC converter for converting the motor current signals into a first detection current signal and a second detection current signal, the motor current signals being indicative of the at least three alternating current values with phase displacements, and the first and second detection current signals being indicative of direct current values;

first deviation calculation means for calculating a deviation of the direct current value represented by the first detection current signal from a the first target current value and producing a deviation signal indicative of the calculated deviation;

second deviation calculation means for calculating a deviation of the direct current value represented by the second detection current signal from the second target current value and producing a deviation signal indicative of the calculated deviation;

motor control means for controlling driving of the brushless motor through a control process on the basis of the deviation signals outputted from the first and second deviation calculation means; and attenuation means provided in a feedback transmission path of the second detection current signal for attenuating a high frequency noise mixed in the second detection current signal.

2. An electric power steering apparatus according to claim 1, wherein the control process achieved in the motor control means is a vector control process, the first target current value and the first detection current signal are related to a d-axis current in a d-q coordinate system, the second target current value and the second detection current signal are related to a q-axis current in the d-q coordinate system, and the AD/DC converter comprises a three-phase AC/d-q coordinate transformation means.

3. An electric power steering apparatus comprising:

steering torque detecting means for detecting a steering torque produced in accordance with operation of a steering wheel and generating a steering torque signal corresponding to the detected steering torque;

a brushless motor PWM-driven with motor currents to apply a steering assist torque to a steering system, the motor currents being at least three alternating currents having phase displacements in relation to one another;

target current setting means for setting a d-axis target current value and a q-axis target current value, the q-axis target current value being determined on the basis of at least the steering torque signal;

motor current detecting means for detecting motor current values supplied to the brushless motor and generating motor current signals corresponding to the detected motor current values;

a polyphase AC/d-q coordinate converter for converting the motor current signals outputted from the motor current detecting means to a d-axis detection current signal and a q-axis detection current signal, the d- and q-axis detection current signals being indicative of direct current values;

first deviation calculation means for calculating a deviation of the direct current value represented by the q-axis detection signal from the q-axis target current value and generating a deviation signal indicative of the calculated deviation;

second deviation calculation means for calculating a deviation of the direct current value represented by the d-axis detection current signal from the d-axis target current and generating a deviation signal indicative of the calculated deviation;

motor control means for controlling driving of the brushless motor through a vector control process on the basis of the deviation signals outputted from the first and second deviation calculation means; and attenuation means provided in a feedback transmission path of the q-axis detection current signal for attenuating a high frequency noise mixed in the q-axis detection current signal.

4. An electric power steering apparatus according to claim 3, wherein the motor currents are a three-phase alternating current, the motor current detection means detects at least two current values of the three alternating currents having phase displacements supplied to the brushless motor and generates motor current signals indicative of the detected at least two motor current values, and the polyphase AC/d-q coordinate converter comprises a three-phase AC/d-q coordinate transformation means.

5. An electric power steering apparatus according to claim 3, further including second attenuation means provided in a feedback path of the d-axis detection current signal for attenuating a high frequency noise mixed in the d-axis detection current signal.

6. An electric power steering apparatus according to claim 1, wherein the attenuation means comprises a phase-lag compensation element.

7. An electric power steering apparatus according to claim 1, wherein the attenuation means comprises a phase-lead-lag compensation element.

* * * * *